Dec. 30, 1941.   E. BUGATTI   2,268,183
COOLING SYSTEM FOR AIRCRAFT
Filed March 16, 1939
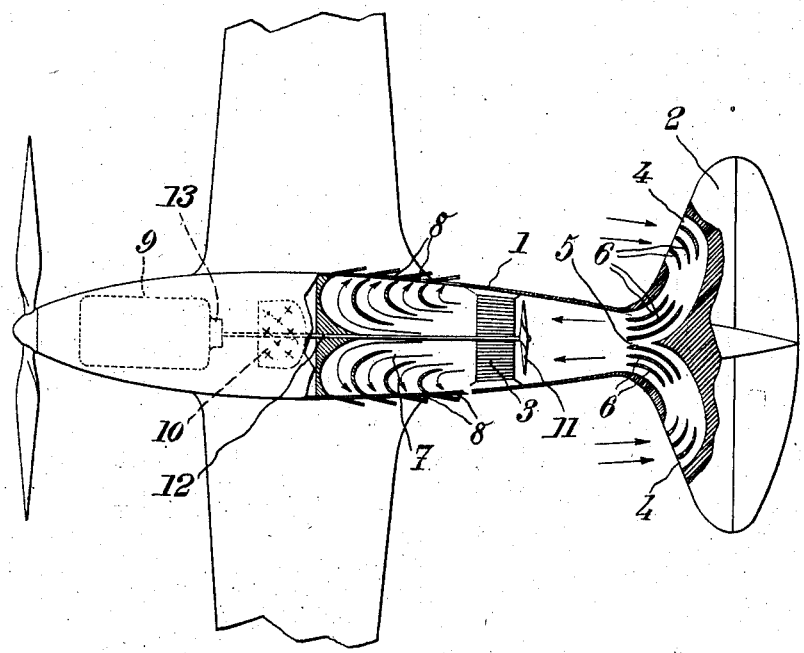
Inventor
Ettore Bugatti,
By Bailey & Parent
Attorneys Patented Dec. 30, 1941

2,268,183

UNITED STATES PATENT OFFICE 2,268,183

COOLING SYSTEM FOR AIRCRAFT

Ettore Bugatti, Paris, France

Application March 16, 1939, Serial No. 262,268
In Luxemburg March 17, 1938

2 Claims. (Cl. 244—57)

The present invention relates to cooling devices for the engines of aircraft including an element or tail fixed to the rear of a fuselage or the like which contains the elements to be cooled (radiators, cooling fins or the like).

The object of the present invention is to provide a device of this kind which is better adapted to meet the requirements of practice than similar devices used for the same purpose up to this time.

According to the essential feature of the present invention, the cooling air enters through apertures provided in the leading edge of the tail of the aircraft, then it moves in a front-ward direction inside the fuselage, so as to be able to pass through the elements to be cooled, which are located in the rear part of said fuselage; finally, this air flows out through orifices subjected to a suction.

Other features of the present invention will result from the following detailed description of some specific embodiments thereof.

A preferred embodiment of the present invention will be hereinafter described with reference to the accompanying drawing, given merely by way of example, and in which:

The only figure is a diagrammatic plan view, with parts in section, of the fuselage of an airplane fitted with the cooling device according to the present invention.

It will be supposed, in the following detailed description, that it is desired to provide a cooling device for the power plant of an airplane including a fuselage 1 provided, at the rear, with a tail 2.

I provide, on the inside of the fuselage, and preferably near the rear thereof, the radiating elements 3 to be cooled, these radiating elements being carried by a radiator of the liquid type.

I provide inlets 4 for the cooling air on the leading edge of tail 2, that is to say in a zone of high dynamic pressure.

I provide, in the thickness of the tail system, and also in the rear part of the fuselage, a system of circuits 5 adapted to guide toward the front the air that has entered through inlets 4. This system of conduits may consist of two branches starting respectively from the leading edge on the right hand side and the left hand side of the tail (which may, of course, be horizontal, vertical, or V-shaped) and opening both into a single conduit provided on the inside of the fuselage.

Advantageously, these conduits are made of a cross section which increases in the direction of the flow, in such manner as to obtain a partial transformation of the velocity of the air into pressure, the efficiency of this transformation being the better as the air is better guided by conduits 5. Advantageously, these conduits are fitted with fixed blades 6 for deflecting the air streams with the minimum of eddies and the like.

I provide, near the outlet of the systems of conduits 5, the radiator means 3, preferably in such manner that the air from conduits 5 flows in a frontward direction through said radiator means.

Finally, I provide, ahead of the radiator system, a space 7 communicating with the outside through apertures 8 arranged, as above explained in a zone of dynamic suction, for instance in the wall of the fuselage and ahead of the part of said fuselage containing said radiator means.

It is thus possible to house the radiator in the rear part of the fuselage, behind the engine 9 and the pilot's seat 10, in a space which is but rarely utilized, the system that is obtained being such that the cooling air flows through a kind of loop as is obvious from the drawing.

It is possible to increase the velocity of the cooling air flowing through the system by providing in conduits 5, for instance in the vicinity of the radiating elements 3, a fan 11 or the like, which is advantageously driven by engine 9, to which it is then connected through an intermediate shaft 12, eventually with the interposition of a clutch 13.

Such a system has, among other advantages, that of reducing to a very low value, the head resistance due to the necessity of providing a cooling system.

Furthermore, it ensures a good utilization of the free spaces located at the rear of the power plant in the fuselage.

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the accompanying claims.

What I claim is:

1. In an aircraft having, in the front part of the fuselage thereof, a propeller and a motor and, in the rear part of said fuselage forward of the empennage of said aircraft, a radiator for said motor, means for directing cooling air past said radiator in a direction from rear to front with respect to said fuselage, comprising conduit means in the form of the rear portion of said fuselage where said rear portion increases in cross-section from rear to front, said radiator being in said conduit means, the attacking edge portion of said empennage having air inlet openings therein, means connecting said inlet openings with the rear end of said conduit means, and air exhaust openings in said fuselage communicating with said conduit means forward of said radiator whereby when said aircraft is in operation cooling air for said radiator enters said inlet openings under relatively high pressure, is directed forwardly through said conduit means past said radiator, and is exhausted through said exhaust openings in a zone of relatively low air pressure.

2. In an aircraft having, in the front part of the fuselage thereof, a propeller and a motor and, in the rear part of said fuselage forward of the empennage of said aircraft, a radiator for said motor, means for directing cooling air past said radiator in a direction from rear to front with respect to said fuselage, comprising conduit means in the form of the rear portion of said fuselage where said rear portion increases in cross-section from rear to front, said radiator being in said conduit means, the attacking edge portions of the empennage on each side of said fuselage having inlet openings therein, branch conduits connecting said inlet openings with the rear end of said conduit means, and air exhaust openings through the wall of said fuselage on each side thereof communicating with said conduit means forward of the radiator whereby, when said aircraft is in operation, cooling air enters said inlet openings under relatively high pressure, is directed forwardly through said conduit means past said radiator, and is exhausted through said exhaust openings in a zone of relatively low air pressure.

ETTORE BUGATTI.